United States Patent Office 3,813,384
Patented May 28, 1974

3,813,384
BASICALLY SUBSTITUTED BENZYL PHTHALA-
ZONE DERIVATIVES, ACID SALTS THEREOF
AND PROCESS FOR THE PRODUCTION THERE-
OF
Dietrich Vogelsang, deceased by Ursula Vogelsang Nee
Schafer, Heir Helpup, Gerhard Scheffler, Sennei, Nor-
bert Brock, Uerentrup, and Dieter Lenke, Bielefeld,
Germany, assignors to Asta-Werke Aktiengesellschaft,
Chemische Fabrik, Westfalen, Germany
No Drawing. Filed Jan. 17, 1972, Ser. No. 218,532
Int. Cl. C07d 25/00, 51/06
U.S. Cl. 260—239 A                4 Claims

ABSTRACT OF THE DISCLOSURE

New basically substituted benzyl phthalazone deriva-
tives of formula I

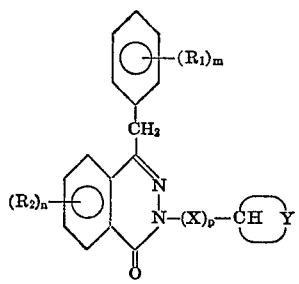

and their pharmacologically acceptable acid addition salts
thereof. These new benzyl phthalazone derivatives are
excellent antihistamines and therefore useful in the treat-
ment of histamine induced disturbances.

---

The present invention is related to new basically sub-
stituted benzyl phthalazone derivatives having a high
antihistamine effectiveness, the physiologically acceptable
acid addition salts thereof, and process for the production
thereof.

The new benzyl phthalazone derivatives according to
the present invention are characterized by a cyclic basic
residue which is connected with the amide nitrogen atom
in the position 2 of the phthalazone nucleus by a carbon
atom of this cyclic basic residue directly or by way of
an alkylene chain. Basically substituted phthalazones are
known already for instance from German patent specifica-
tion 1,046,625. These phthalazones are compounds having
the basic residue substituted on an aliphatic alkylene
chain, this basic residue being a tertiary amine substituted
by two alkyl groups or by an alkylene group to form a
cyclic residue. However, these cyclic basic residues are
connected with the amide nitrogen atom of the phthal-
azone nucleus by the nitrogen atom of the cyclic amine
by way of the alkylene chain.

The basically substituted benzyl phthalazone derivatives
according to the present invention have the formula I

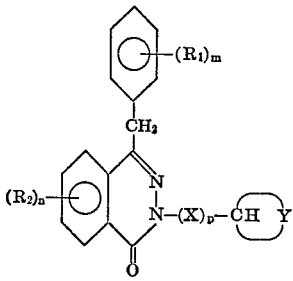

wherein $R_1$ and $R_2$, which may be identical or different
from each other, represent hydrogen, halogen, lower alkyl,
lower alkoxy, hydroxy, trifluoromethyl, nitro or sub-
stituted or unsubstituted amino groups, X is an alkylene
group having the formula

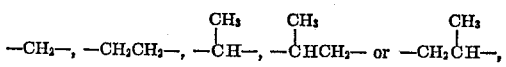

$m$ and $n$, which may be identical or different from each
other, represent integers between 1 and 3, $p$ is 0 or 1,
and the groupment

represents an unsubstituted monocyclic, bicyclic or tri-
cyclic residue having from 3 to 8 carbon atoms and one
or two nitrogen atoms or such a residue being sub-
stituted by one or several lower alkyl groups, the nitrogen
atom or atoms of this residue being substituted by hy-
drogen or a lower alkyl group having from 1 to 4 carbon
atoms which lower alkyl group may be connected with
another atom of the cyclic residue thus forming a bi-
cyclic or tricyclic group.

In view of their particular good properties those com-
pounds of formula I and their physiologically acceptable
acid addition salts are preferred wherein $R_1$ and $R_2$ rep-
resent hydrogen, halogen, hydroxy, lower alkyl, lower
alkoxy or trifluoromethyl, and $m$ and $n$ are 1 or 2. Par-
ticularly preferred are those compounds of this preferred
group, wherein $R_1$ represents such a group as indicated
above and $R_2$ is a hydrogen atom.

Among these compounds those benzyl phthalazones and
salts are preferred, wherein X is —$CH_2$— or

Most preferred compounds among the latter group of
compounds are those, wherein additionally the group-
ment

contains 4 to 7 carbon atoms in the cyclic group, in partic-
ular the N-substituted pyrrolidinyl, piperidyl, perhydro-
azepinyl, quinuclidyl, tropanyl and scopyl groups, the tro-
panyl and the scopyl groups being connected with the
amide nitrogen atom of the phthalazone directly by way
of a ring carbon atom of this tropanyl or scopyl group,
while the pyrrolidinyl, piperidyl, perhydroazepinyl or
quinuclidyl residue is connected with the amide nitrogen
atom of the phthalazone either directly or by way of an
alkylene chain X enumerated hereinabove as preferred.

The most preferred group of compounds of Formula I
and their physiologically acceptable acid addition salts
comprises those compounds wherein $R_1$ is a hydrogen,
fluorine, chlorine or bromine atom or a methoxy, ethoxy,
methyl, hydroxy or trifluoromethyl group, $R_2$ is a hydro-
gen atom, $m$ is 1 or 2, $p$ is 0, and the groupment

is the N-methyl perhydroazepinyl, the tropanyl or the
quinuclidyl group, in particular the N-methyl perhydro-
azepinyl-(4), the tropanyl-(3) or the quinuclidyl-(3)
group. Thus, the annelled benzene ring of these benzyl
phthalazone derivatives is unsubstituted and the perhydro-
azepinyl, tropanyl or quinoclidyl residue is connected
directly with the amide nitrogen atom of the phthalazone
nucleus.

The process for producing the new, basically substituted
benzyl phthalazone derivatives of formula I and the physiologically acceptable acid addition salts thereof is characterized by that (A) a compound of formula II

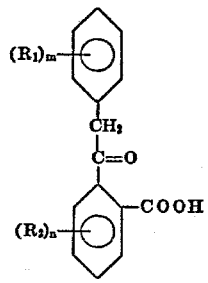

II or a reactive derivative thereof, wherein $R_1$, $R_2$, $m$ and $n$ have the same meaning as in formula I, is subjected to reaction with a hydrazine of formula III $$H_2N—NH—R_3 \qquad III$$

wherein $R_3$ is hydrogen or the groupment

wherein X, $p$ and Y have the same meaning as in formula I, or (B) a compound of formula IV

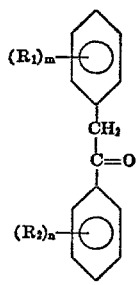

IV wherein $R_1$, $R_2$, $m$ and $n$ have the same meaning as in formula I, is subjected to reaction with a compound of formula V

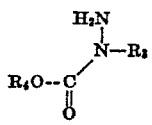

V wherein $R_3$ has the same meaning as in formula III and $R_4$ is a lower alkyl group, or (C) a compound of formula VI

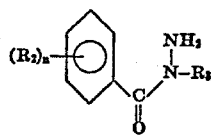

VI wherein $R_2$ and $n$ have the same meaning as in formula I and $R_3$ has the same meaning as in formula III, is subjected to reaction with a compound of formula VII

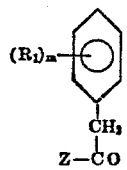

VII wherein $R_1$ and $m$ have the same meaning as in formula I and Z is a halogen atom or a hydroxy or alkoxy group, or (D) a compound of formula I wherein the nitrogen atom of the basic residue

is substituted by hydrogen, is subjected to reaction with an alkylating agent or (E) a compound of formula IX

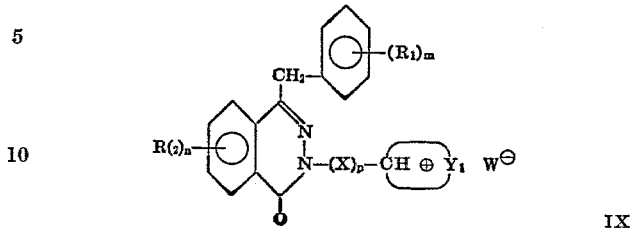

IX wherein $R_1$, $R_2$, $m$, $n$, X and $p$ have the same meaning as in formula I and where $W^\ominus$ is an anion, is subjected to hydrogenation, and subjecting a resulting benzyl phthalazone derivative wherein $R_3$ is hydrogen, to reaction with a compound of formula VIII $$Q—R_3 \qquad VIII$$

wherein Q represents an atom or group which upon substitution of the amide nitrogen atom, is split off together with its electron doublet, such as a halogen atom or a sulfonic ester group, and $R_3$ is the group

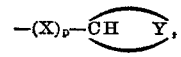

X, $p$ and Y having the same meaning as in formula I, and converting the thus obtained benzyl phthalazone derivatives, if desired, with an appropriate acid into a physiologically acceptable acid addition salt or converting a resulting salt of these benzyl phthalazone derivatives into the free base.

A reactive derivative of the carboxylic acid of formula II is in particular an acid halogenide, ester or anhydride. Other reactive derivatives of the compounds of formula II, which may be used instead of the benzene —o-ketocarboxylic acid or its halogenide, ester or anhydride, are the unsaturated or saturated phthalides or phthalimidines of the formula X

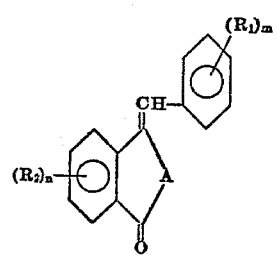

X and XI

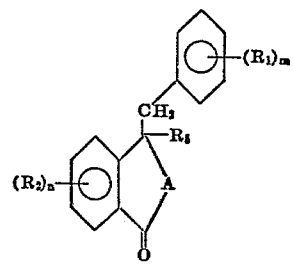

XI

In the above formulas X and XI, $R_1$, $R_2$, $m$ and $n$ have the same meaning as in formula I and A is an oxygen atom or imino group and $R_5$ is halogen, $NH_2$, ArNH, OH, an alkoxy group or the like. Other compounds of this type are those of formula XII

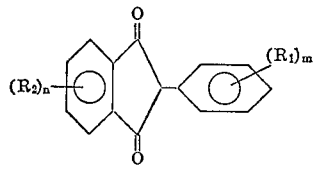

wherein $R_1$, $R_2$, $m$ and $n$ have the same meaning as in formula I. These compounds produce derivatives of the benzene-o-ketocarboxylic acid of formula II when subjected to reaction with a compound of formula III.

The above procedures A, B and C are carried out in the absence or presence of usual solvents and auxiliary agents at a temperature elevated up to about 180° C. and in a pH range varying from the acidic to the alkaline pH.

Useful solvents are, for instance, water, alcohols, dimethylformamide, dioxane, pyridine, triethylamine and hydrocarbons. Useful auxiliary agents are bases, acids and condensation agents usual for such reactions.

The procedure D is carried out with usual alkylating agents such as fomaldehyde in the presence of a reducing agent such as formic acid, $NaBH_4$ or hydrogen, as well as dimethylsulfate and $K_2CO_3$, alkyl halogenides or diazomethane. The reaction E preferably is carried out with catalytic hydogen. Useful catalysts are preferably the precious metal and nickel catalysts.

When carrying out the reaction with the alkylating agents of formula VIII, the known cyclammonium rearrangement may take place with a change in the ring size.

The compounds of formula I and their acid addition salts to a great extent are optically active with the carbon atom of the cyclic base group which is connected with the amide nitrogen atom of the phthalazone nucleus directly or by way of an alkylene group. The racemates may be split up into the optical antipodes in manners known per se.

The compounds according to the present invention are histaminolytically active. They are characterized by an extremely high activity upon parenteral and above all oral application. They furthermore produce this high activity over a long period of time. This activity may be shown in the histamine aerosol test on guinea-pigs or in the lesion test in humans, the lesion being caused by histamine or a histamine liberator (Quaddel-Test).

In guinea-pigs, the histaminolytical activity has been tested in the histamine aerosol test. Guinea-pigs of the Pirbright race and weighing 300 to 700 grams each have been tested. The animals inhale an aerosol of an aqueous solution of histamine dihydrochloride in a concentration of 4 mg./ml. The inhalation produces severe dyspnea (severe shortness of breath, lateral positioning) in untreated animals within 2 minutes. In order to determine the histaminolytical activity, the test compounds are applied subcutaneously or orally to groups of 8 to 10 animals. Thereafter, the test animals are treated for varying times with the histamine aerosol. The test animals are considered as protected if they tolerate the inhalation of the aerosol for 10 minutes without showing severe dyspnea (lateral positioning).

For evaluating the test results, the mean effective doses (DE 50 mg./kg.) are determined by means of a probit analysis from the relation between the dose logarithm and the frequency of protection.

Compounds which are similar in chemical structure to the compounds of the present invention and, therefore, have been used for comparative tests, are 4-benzyl-2-(2-dimethylaminoethyl) - 1 - (2H) - phthalazine (trade product Ahanon® according to German patent specification No. 1,046,625; compound A in Tables I and II) and β - dimethylaminoethyl - (4-chloro-α-methylbenzhydryl)- ether known as highly active histaminolytic (generic name: chlorophenoxamine; H. Arnold et al., Arzneim.-Forsch., 4, 189 (1954); N. Brock et al., Arzneim.-Forsch. 4, 262 (1954); compound B in Tables I and II).

The difference between the products according to the present invention and the comparative products A and B is particularly obvious when administering the test compounds to the test animals orally and treating the test animals with the histamine aerosol 8 hours later. Upon application of 0.0215 mg./kg. of 4-(p-fluorobenzyl)-2-[N-methyl-perhydroazepinyl-(4)]-1-(2H) - phthalazinone or 0.215 mg./kg. of 4 - (p - chlorobenzyl) - 2-[N-methyl-perhydroazepinyl-(4)]-1 - (2H) - phthalazino or 4-(p-chlorobenzyl) - 2-[quinclidyl-(3)]-1-(2H)-phthalazinone not one of the 8 to 10 animals of each group showed dyspena with lateral positioning after treatment with the histamine aerosol. In striking contract thereto, upon applictaion of 10 to 100 times the dose of both comparative compounds (2.15 mg./kg.) 9 of 10 aminals with compound A and 10 of 10 animals with compound b still showed very severe dyspnea with lateral positioning.

TABLE I

Histaminolytical activity in the histamine aerosol test on guinea-pigs; subcutaneous administration of test compounds 1 hour before treatment with the aerosol

| Example number | DE 50 (mg./kg.) | Relative activity [1] |
|---|---|---|
| 3 | 0.0062 | 17.7 |
| 6 | 0.011 | 10.0 |
| 7 | 0.0071 | 15.5 |
| 9 | 0.045 | 2.44 |
| 10 | 0.031 | 3.55 |
| 11 | 0.035 | 3.14 |
| 12 | 0.022 | 5.00 |
| 19 | 0.016 | 6.88 |
| 24 | 0.027 | 4.07 |
| 28 | 0.059 | 1.86 |
| 30 | 0.026 | 4.23 |
| 33 | 0.016 | 6.88 |
| 34 | 0.019 | 5.79 |
| A | 0.11 | 1.00 |
| B | 0.11 | 1.00 |

[1] Activity of A=1.00.

TABLE II

Histaminolytical activity in the histamine aerosol test on guinea-pigs; oral administration of test compounds 2 and 8 hours before treatment with the aerosol

| Example number | DE 50 (mg./kg.) | | Relative activity [1] | |
|---|---|---|---|---|
| | 2 hours | 8 hours | 2 hours | 8 hours |
| 9 | 0.16 | 0.49 | 19.4 | 13.1 |
| 10 | 0.037 | 0.029 | 83.8 | 221 |
| 19 | 0.010 | 0.011 | 310 | 582 |
| 24 | 0.087 | 0.052 | 35.6 | 123 |
| 28 | 0.20 | 0.28 | 15.5 | 22.9 |
| 30 | 0.038 | 0.35 | 81.6 | 18.3 |
| A | 3.1 | 6.4 | 1.00 | 1.00 |
| B | 0.52 | 6.2 | 5.96 | 1.03 |

[1] Activity of A 3 1.00.

The histaminolytical activity of the compounds according to the present invention is substantially higher than those of the comparative test compounds A and B. Upon subcutaneous administration, the relative activity is about 17.7 times larger (Example No. 3) than that of the comparative test compounds. The activity is particularly evident upon oral administration (Table II). The activity is 16 to 310 times higher in a 2 hours test in comparison to the activity of test compound A and is 13 to 582 times higher in the 8 hours test. The 8 hours test clearly demonstrates the very high oral activity of the compounds according to the present process which activity is produced over a prolonged period of time.

The compounds according to the present invention are used as active ingredients in pharmaceutical preparations and may be administered in usual embodiments such as tablets, dragees, capsules, suppositories, drops, ointments, creams as well as injection solutions. They are in particular used for the treatment of the various forms of allergies. Thus, they have been used successfully in humans in the treatment of asthma bronchiale, for the treatment of disorders of the skin and mucous membranes such as urticaria, Quincke's edema, pruritus, eczemas, hay fever and rhinitis vasmotorica. In general, they are administered in such treatments in a dosage of 0.4 to 4 mg. per day and human patient. The symptoms of the above allergic diseases may be effectively reduced upon a single dose for up to 24 hours. The effectiveness of the compounds of the present invention in humans which is produced very rapidly and over a prolonged period of time in comparison to other antihistamines, may be particularly well shown in the reduction of the size of an artificially produced lesion by means of a histamine liberator according to L. Kerp, H. Kasimiar, P. N. Tie, Med. Welt 17 NF, 2794 (1966). The compounds according to the present invention may be used as such or in combination with other active ingredients as they are usual in antihistaminic preparations. With this respect their minimal dose is most advantageous.

The present invention is further illustrated by the following examples. The constitution of the final products has been verified by elementary analysis and infrared and NMR spectra.

EXAMPLE 1

4-benzyl-2-[N-methylpyrrolidinyl-(3)-methyl]-1-(2H)-phthalazinone 10.3 g. of phenylacetophenone-o-carboxylic acid and 6.1 g. of hydrazine sulfate are dissolved in a solution of 3.6 g. of NaOH in 100 cc. of water. The solution is heated to boiling for 2 hours. The precipitate is filtered off with suction, washed with water and dried. The thus obtained 9.2 g. of 4-benzyl-1-(2H)-phthalazinone are added to a solution of 1.4 g. of metallic potassium in 250 cc. of anhydrous alcohol. The resulting mixture is heated to boiling for 30 minutes. The alcohol is distilled off. 10.6 g. of the potassium salt are obtained.

12.4 g. of the tosyl ester of 3-hydroxymethyl-N-methylpyrrolidine and 10.6 g. of the sodium salt of 4-benzyl-1-(2H)-phthalazinone in 100 cc. of dimethylformamide are heated for one hour at 100° C. The solvent is separated in a rotary evaporator and the residue is triturated with water. The insolubles are dissolved in ether and the ethereal solutions are extracted with dilute hydrochloric acid. The acidic extracts are rendered alkaline by the addition of an aqueous potassium hydroxide solution. The separated oily product is dissolved in ether and the ethereal solutions are dried over anhydrous $Na_2SO_4$. Upon evaporation of the ether, 11 g. of the base are obtained. The fumarate crystallizes as monohydrate. F.p.: 129–132° C.

EXAMPLE 2

4-benzyl-2-{2-N-methylpiperidyl-(2)]ethyl}-1-(2H)-phthalazinone 13.3 g. of phenylacetophenone-o-carboxylic acid and 7.9 g. of hydrazine sulfate are heated with 4.7 g. of NaOH in 150 cc. of water. 11.9 g. of 4-benzyl-1-(2H)-phthalazinone are recovered as described in Example 1. This compound is subjected to reaction with a solution of 1.9 g. of metallic potassium in 300 cc. of anhydrous alcohol as described in Example 1, thus resulting in 13.7 g. of the potassium salt of 4-benzyl-1-(2H)-phthalazinone.

A solution of 8.9 g. of 2-(2-chloroethyl) - N - methyl piperidine in 25 cc. of dimethylformamide are added dropwise at 100° C. to a solution of 13.7 g. of the potassium salt of 4-benzyl-1-(2H)-phthalazinone in 150 cc. of dimethylformamide. The resulting solution is further stirred for 2 hours. The solvent is distilled off and the residue is treated with water. The insoluble product is dissolved in ether, the ethereal solutions are extracted with dilute hydrochloric acid and the acidic extracts are rendered alkaline by the addition of aqueous potassium hydroxide with cooling. The separated oil is again dissolved in ether and the ethereal solution is dried over anhydrous $Na_2SO_4$. The hydrochloride of 4-benzyl-2-{2-[N-methyl-piperidyl (2)] - ethyl} - 1 - (2H) - phthalazinone is precipitated by dropwise addition of ethereal hydrochloric acid. Thus, 14 g. of the hydrochloride are obtained. After recrystallization, the hydrochloride melts at 201–203° C.

The following compounds have ben prepared as described in Examples 1 and 2:

(3) 4 - (p - chlorobenzyl) - 2 - [N-methylpyrrolidinyl-(2)-methyl] - 1 - (2H) - phthalazinone hydrochloride. F.p.: 206–207° C.

(4) 4-(p - chlorobenzyl) - 2 - [N - methylpiperidyl)-(2) - methyl] - 1 - (2H)-phthalazinone sulfate hydrate. F.p.: above 90° C. (with decomposition).

(5) 4-benzyl - 2 - [N - methylpiperidyl - (3) - methyl]-1 - (2H) - phthalazinone hydrochloride hydrate. F.p.: above 77° C. (with decomposition).

(6) 4-(p - methylbenzyl) - 2 - [N - methylpyrrolidinyl-(2)-methyl] - 1 - (2H) - phthalazinone hydrochloride hydrate. F.p. 126–128° C.

(7) 4-(p - methoxybenzyl) - 2 - [N - methylpyrrolidinyl-(2) - methyl] - 1 - (2H) - phthalazinone. F.p.: 111–114° C.

(8) 4-(p - chlorobenzyl) - 2 - {1 - [N-methylpiperidyl-(2)] - ethyl} - 1 - (2H) - phthalazinone citrate. F.p.: 103–105° C.

EXAMPLE 9

4-benzyl-2-[N-methyl-perhydroazepinyl-(4)]-1-(2H)-phthalazinone

A solution of 8 g. of 4-chloro-N-methyl-perhydroazepine in 20 cc. of toluene are added to a suspension of 13.7 g. of the potassium salt of 4-benzyl-1-(2H)-phthalazinone in 250 cc. of anhydrous toluene dropwise with vigorous stirring at 40° C. Heating is continued slowly to boiling whereafter refluxing is continued for another 5 hours. The solvent is separated in a rotary evaporator and the residue is washed with water. The insoluble oily product is dissolved in ether and the ethereal solution is extracted with dilute hydrochloric acid. The acidic extracts are rendered alkaline by the addition of aqueous potassium hydroxide and the separated oil is again dissolved in ether. The ethereal solutions are dried over anhydrous $Na_2SO_4$. Upon evaporation of the solvent, 32 g. of a raw product are obtained. This product is converted into the fumarate which is recrystallized, thus resulting in the fumarate hydrate of the 4-benzyl-2-[N-methyl-perhydroazepinyl - (4)] - 1 -(2H) - phthalazinone. F.p.: 156–160° C.

In addition, 4-benzyl-2-{2-[N-methyl-pyrrolidinyl-(2)] ethyl}-1-(2H)-phthalazinone may be recovered from the mother liquors.

EXAMPLE 10

4-(p-chlorobenzyl)-1-[N-methyl-perhydroazepinyl-(4)]-1-(2H)-phthalazinone 30.6 g. of p-chlorobenzylacetophenone - o - carboxylic acid and 16 g. of hydrazine sulfate are heated with 9.4 g. of NaOH in 250 cc. of water. After washing and drying, 27 g. of 4-(p-chlorobenzyl)-1-(2H)-phthalazinone are obtained.

20 g. of 2-(2-chloroethyl)-N-methylpyrrolidine hydrochloride are added to a solution of 4.4 g. of NaOH in 20 cc. of water. This solution is heated to 70° C. and added dropwise to a mixture of the above obtained 27 g. of 4-(p-chlorobenzyl)-1-(2H)-phthalazinone and 40 cc. of 50% soda lye heated to 70° C. The mixture is kept at this temperature and heated for another hour. After cooling and diluting with water, the insoluble materials are separated and dissolved in methylene chloride. The solution is extracted with dilute hydrochloric acid and the acidic extracts are rendered alkaline by the addition of aqueous potassium hydroxide. The separated oil is again dissolved in methylene chloride and the solution is dried and evaporated. The crude final product is obtained in a yield above 90% of the theoretical. It is converted into a salt and purified by recrystallization. The hydrochloride of 4-(p - chlorobenzyl) - 2 - [N-methyl-perhydroazepinyl-(4)] - 1 (2H) - phthalazinone melts at 225–229° C.

4-(p-chlorobenzyl)-2-{2-[N - methylpyrrolidinyl-(2)]-ethyl}-1-(2H)-phthalazinone may be recovered from the filtrate from recrystallization.

The following compounds have been prepared as described in Examples 9 and 10.

(11) 4-(p-methylbenzyl) - 2-[N - methyl-perhydroazepiny 1 -(4)]-1-(2H)-phthalazinone sulfate. F.p.: 199–203° C.

(12) 4-(p-methoxybenzyl) - 2 - [N-methyl-perhydroazepinyl-(4)]-1-(2H)-phthalazinone sulfate. F.p.: 203–205° C.

(13) 4-(3,4 - dimethoxybenzyl) - 2-[N-methyl-perhydroazepinyl-(4)]-1-(2H)-phthalazinone sulfate. F.p.: 118–120° C.

(14) 4-(2-chlorobenzyl-2 - [N-methyl-perhydroazepinyl (4)]-1-(2H) - phthalazinone hydrochloride. F.p.: 198–200° C.

(15) 4-(3-chlorobenzyl) - 2 - [N-methyl-perhydroazepinyl-(4)]-1-(2H)-phthalazinone. F.p.: 77–78° C.

(16) 4-(p-chlorobenzyl)-6,7 - dimethoxy-2-[N-methyl-perhydroazepinyl-(4)]-1 - (2H)-phthalazinone sulfate. F.p.: 286–290° C.

(17) 4-(2,4-dichlorobenzyl) - 2 - [N-methyl-perhydroazepinyl-(4)]-1-(2H)-phthalazinone fumarate. F.p. 207–211° C.

(18) 4-(p-dimethylaminobenzyl)-2-[N - methyl-perhydroazepinyl-(4)]-1 - (2H)-phthalazinone fumarate. F.p.: 177–182° C.

(19) 4-(p-fluorobenzyl) - 2 - [N-methyl-perhydroazepinyl-(4)]-1-(2H)-phthalazinone sulfate. F.p.: 211–220° C.

(20) 4-(p-bromobenzyl) - 2 - [N-methyl-perhydroazepinyl-(4)]-1-(2H)-phthalazinone sulfate. F.p.: 215–220° C.

(21) 4-(p-acetaminobenzyl )- 2 - [N-methyl-perhydroazepinyl-(4)]-1-(2H)-phthalazinone hydrochloride hydrate. F.p. 275–278° C.

(22) 4-(p-aminobenzyl) - 2 - [N-methyl-perhydroazepinyl-(4)]-1-(2H)-phthalazinone dihydrochloride hydrate. F.p. 270–277° C.

(23) 4-(p-hydroxybenzyl) - 2 - [N-methyl-perhydroazepinyl-(4)]-1-(2H)-phthalazinone hydrochloride hydrate. F.p.: 260–266° C.

EXAMPLE 24

4-(p-chlorobenzyl)-2-[quinuclidyl-(3)]-1-(2H)-phthalazinone 5.5 g. of p-chlorophenylacetophenone-o-carboxylic acid are dissolved in 30 cc. of 2 N soda lye and 30 cc. of water. 4.3 g. of 3-quinuclidyl-hydrazine dihydrochloride are added thereto and the mixture is heated to boiling for 3 hours under an atmosphere of nitrogen. Upon cooling, a highly viscous red oil is separated which crystallizes upon scratching. The solid material is filtered off, washed with water and recrystallized, 4.4 g. of 4-(p-chlorobenzyl)-2-[quinuclidyl-(3)] - 1 - (2H)-phthalazinone are obtained. This product melts at 181–182° C.

EXAMPLE 25

4-(p-chlorobenzyl)-2-[N-methylpiperidyl-(4)]-1-(2H)-phthalazinone 11 g. of p-chlorophenylacetophenone-o-carboxylic acid are dissolved in 120 cc. of ethyl alcohol. A solution of 8 g. of N-methylpiperidyl-(4)-hydrazine dihydrochloride are added thereto and the mixture is heated to boiling for 8 hours under an atmosphere of nitrogen. The alcohol is distilled off and the residue is triturated with dilute soda lye. The insoluble oily product is dissolved in chloroform, the chloroform solution is washed and dried. Upon evaporation, 8.4 g. of the phthalazinone base are obtained. The fumarate melts at 191–193° C.

The following compounds have been prepared as described in Examples 24 and 25.

(26) 4-benzyl - 2 - [N-methylpiperidyl-(4)]-1-(2H)-phthalazinone hydrate. F.p.: 106–110° C.

(27) 4-(p-chlorobenzyl) - 2 - [1,3-dimethyl-piperidyl-(4)]-1-(2H)-phthalazinone fumarate. F.p.: 219–221° C.

(28) 4-(p-chlorobenzyl) - 2 - [tropanyl-(3)]-1-(2H)-phthalazinone hydrochloride hydrate. F.p.: 270–274° C.

(29) 4-benzyl - 2 - {2 - [N-methylpyrrolidinyl-(2)]-ethyl}-1-(2H)-phthalazinone fumarate hydrate. F.p.: 95–99° C.

(30) 4-benzyl-2-[quinuclidyl-(3)] - 1 - (2H)-phthalazinone fumarate hydrate. F.p.: 233–235° C.

(31) 4 - (p-chlorobenzyl)-2 - {2-[N-methylpyrorolidinyl-(2)]-ethyl} - 1 - (2H)-phthalazinone hydrochloride. F.p.: 220–224° C.

(32) 4 - (p-chlorobenzyl)-2 - [N - methylpyrrolidinyl-(3)]-1-(2H)-phthalazinone. F.p.: 117–120° C.

(33) 4-(p-methoxybenzyl) - 2 - [quinuclidyl-(3)]-1-(2H)-phthalazinone hydrochloride. F.p.: 236–237° C.

(34) 4-(p-fluorobenzyl) - 2 - [N-methylpyrrolidinyl-(3)]-1-(2H)-phthalazinone. F.p.: 90–93° C.

(35) 4 - (p-methylbenzyl) - 2-[N - methylpyrrolidinyl-(3)]-1-(2H)-phthalazinone. F.p.: 96–98° C.

(36) 4-(p-chlorobenzyl) - 2 - [nortropanyl-(3)]-1-(2H)-phthalazinone hydrochloride. F.p.: 320° C.

(37) 4 - (p - chlorobenzyl) - 2 - [perhydroazepinyl-(4)]-1-(2H)-phthalazinone fumarate, F.p.: decomposition.

EXAMPLE 38

4-(p-chlorobenzyl)-2-[N-methyl-perhydroazepinyl-(4)]-1-(2H)-phthalazinone 1.0 g. of 4-(p-chlorobenzyl)-2-[perhydroazepinyl-(4)]-1-(2H)-phthalazinone are heated to boiling for 5 hours with 10 g. of a 40% aqueous formaldehyde solution and 11.6 g. of formic acid. The solution is evaporated and the residue is triturated with dilute soda lye. The insoluble material is dissolved in chloroform and the chloroform solution is dried and evaporated. The residue is dissolved in ether. 0.8 g. of the hydrochloride are precipitated by the addition of etheral hydrochloric acid. After recrystallization from alcohol, the compound melts at 225–229° C.

This compound is identical with the final product obtained according to Example 10.

The following compound has been prepared as described in Example 38:

(39) 2 - [N-methyl-perhydroazepinyl - (4)] - 4 - (p-trifluoromethylbenzyl)-1-(2H)-phthalazinone.

EXAMPLE 40

4-(p-chlorobenzyl)-2-[N-methylpiperidyl-(3)]-1-(2H)-phthalazinone 4.9 g. of 3 - [4 - (p-chlorobenzyl)-1-oxo-phthalazinyl-(2)]-1-methylpyridinium iodide are subjected to hydrogenation in 300 cc. of ethyl alcohol in the presence of $PtO_2$ as catalyst for 7 hours at 80° C. and at a hydrogen pressure of 100 atmospheres. The catalyst is filtered off and the alcohol is distilled off. The residue is treated with dilute soda lye and the insoluble materials are dissolved in methylene chloride. The methylene chloride solution is washed with water and dried over potash. The solvent is filtered off and the solid residue is recrystallized from 60 to 70% ethyl alcohol. The yield is 2.5 g. F.p.: 154–156° C.

The following compounds have been prepared as described in Example 40:

(41) 4 - (p-methylbenzyl) - 2 - [N-methylpiperidyl-(3)]-1-(2H)-phthalazinone. F.p.: 137–139° C.

(42) 4 - (p-methoxybenzyl) - 2 - [N-methylpiperidyl-(3)]-1-(2H)-phthalazinone. F.p.: 87–93° C.

EXAMPLE 43

Tablets containing the products according to the present invention are prepared according to the following recipe as exemplified with the compound of Example 19:

|  | Mg. |
|---|---|
| Active ingredient according to Example 19 | 1.0 |
| Corn starch | 51.0 |
| Secondary calcium phosphate, anhydrous | 20.0 |
| Lactose | 20.0 |
| Polyvinylpyrrolidone | 3.0 |
| Talcum | 4.0 |
| Magnesium stearate | 1.0 |
|  | 100.0 |

The active compound is dissolved together with the polyvinylpyrrolidone in 5 times the amount of chloroform. A homogeneous mixture of calcium phosphate, lactose and 60% of the corn starch are mixed therewith and granulated. The dried granulate sieved to a maximal particle size of 0.75 mm. is mixed with the remaining amount of corn starch, talcum and magnesium stearate for half an hour and the mixture is pressed to tablets weighing 100 mg. each and having a diameter of 6 mm.

EXAMPLE 44

As described in Example 43, dragee-kernels weighing 100 mg. having a diameter of 6 mm. and a camber diameter of 5 mm. are prepared. These kernels are coated with a usual dragee coating to a final weight of 170 mg.

Another batch of kernels is sprayed with a lacquer solution instead of the dragee coating. The resulting lacquer coating comprises:

|  | Mg. |
|---|---|
| Hydroxypropylmethyl cellulose | 1.6 |
| Ethyl cellulose | 0.5 |
| Polyglycol 4000 | 0.4 |
| 1,2-propylene glycol | 0.25 |
| Titanium dioxide | 0.25 |

The above recipes of the Examples 43 and 44 may be further followed by using a smaller amount of the active ingredient, such as 0.6 and 0.3 mg. instead of 1 mg. The difference in weight is balanced by additional amounts of corn starch.

EXAMPLE 45

1 g. of the hydrochloride of active ingredient of Example 10 are milled to a particle size of less than 75μ. The resulting product is mixed slowly with 999 g. of molten suppository fat at 40° C. with vivid stirring. The homogeneous mixture is poured into suppository molds to give suppositories weighing each 1.0 g. In an analogous manner, suppositories may be prepared containing 0.5 mg., 2 mg. or 6 mg. of active ingredient.

EXAMPLE 46

300 mg. of the active compound of Example 19 as hydrochloride are dissolved together with 855 mg. of sodium chloride in 90 cc. of water for ampoules and the solution is filled up to 100 cc. The resulting solution is thoroughly filtered and filled into ampoules measuring 1.1 cc. each. The closed ampoules are sterilized in an autoclave with steam under pressure at at least 120° C. for half an hour.

What we claim is:

1. A benzyl phthalazone compound of the Formula

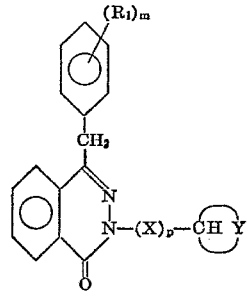

wherein $R_1$ is a member selected from the group consisting of hydrogen, fluorine, chlorine, bromine, methoxy, ethoxy, methyl, hydroxy and trifluoromethyl, X is a member selected from the group consisting of —$CH_2$— and —$CH(CH_3)$—, $m$ is 1 or 2, $p$ is 0 or 1 and

is N-methyl perhydroazepinyl and the physiologically acceptable acid addition salts of said phthalazone derivative.

2. A benzyl phthalazone compound according to claim 1 wherein $p$ is 0 and the physiologically acceptable acid addition salts of said phthalazone derivative.

3. 4 - (p-fluorobenzyl)-2-[N-methyl-perhydroazepinyl-(4)]-1-(2H)-phthalazinone and the pharmacologically acceptable acid addition salts thereof.

4. 4-(p-chlorobenzyl)-2-[N - methyl-perhydroazepinyl-(4)] - 1 - (2H)-phthalazinone and the pharmacologically acceptable acid addition salts thereof.

References Cited

UNITED STATES PATENTS

| 3,017,411 | 1/1962 | Engelbrecht et al. | 260—247.2 |
| 3,222,365 | 12/1965 | Sullivan | 260—250 |
| 2,960,504 | 11/1960 | Druey | 260—250 P |

OTHER REFERENCES

Rodway et al., Chemical Abstract 74: 22865r of Ger. Offen. 2,021,195 (Cl. C07d), Nov. 12, 1970.
Engelbrecht, Chemical Abstract 67: 90826j (1967).
Jucker, Chemical Abstract 54: 22593e (1960).

DONALD G. DAUS, Primary Examiner

R. D. McCLOUD, Assistant Examiner

U.S. Cl. X.R.

260—250, 293.87, 292; 424—244, 250